3,462,922
ROW CROP HARVESTER
Carmen S. Phillips, Downers Grove, and H. Mervin
Risum, Western Springs, Ill., assignors to International Harvester Company, Chicago, Ill., a corporation of Delaware
Filed Oct. 20, 1966, Ser. No. 588,123
Int. Cl. A01d 45/02, 49/00, 57/18
U.S. Cl. 56—23                                                    10 Claims

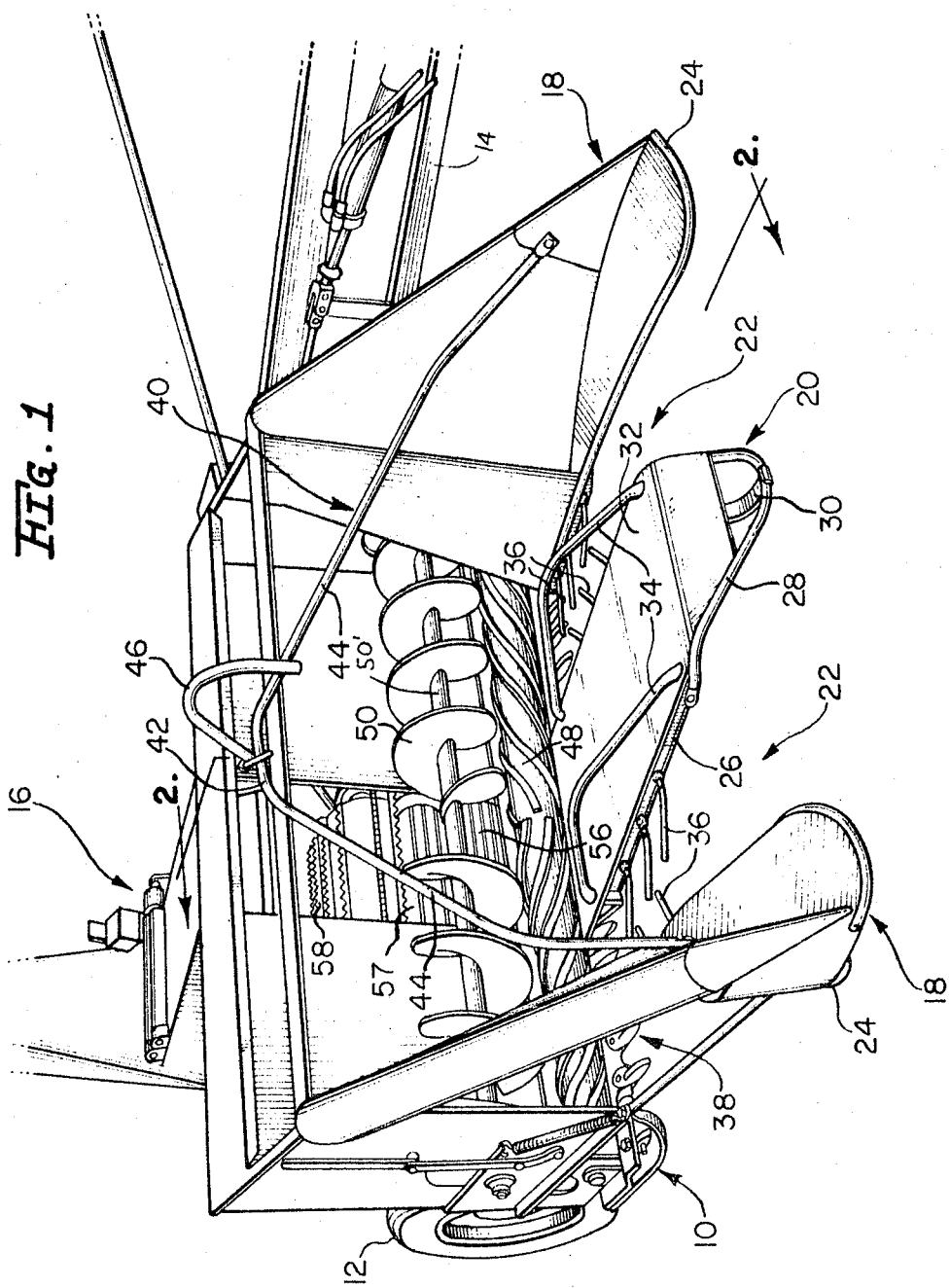
Aug. 26, 1969  C. S. PHILLIPS ET AL  3,462,922
ROW CROP HARVESTER
Filed Oct. 20, 1966  2 Sheets-Sheet 1
Inventors
Carmen S. Phillips
H. Mervin Risum
Attorney

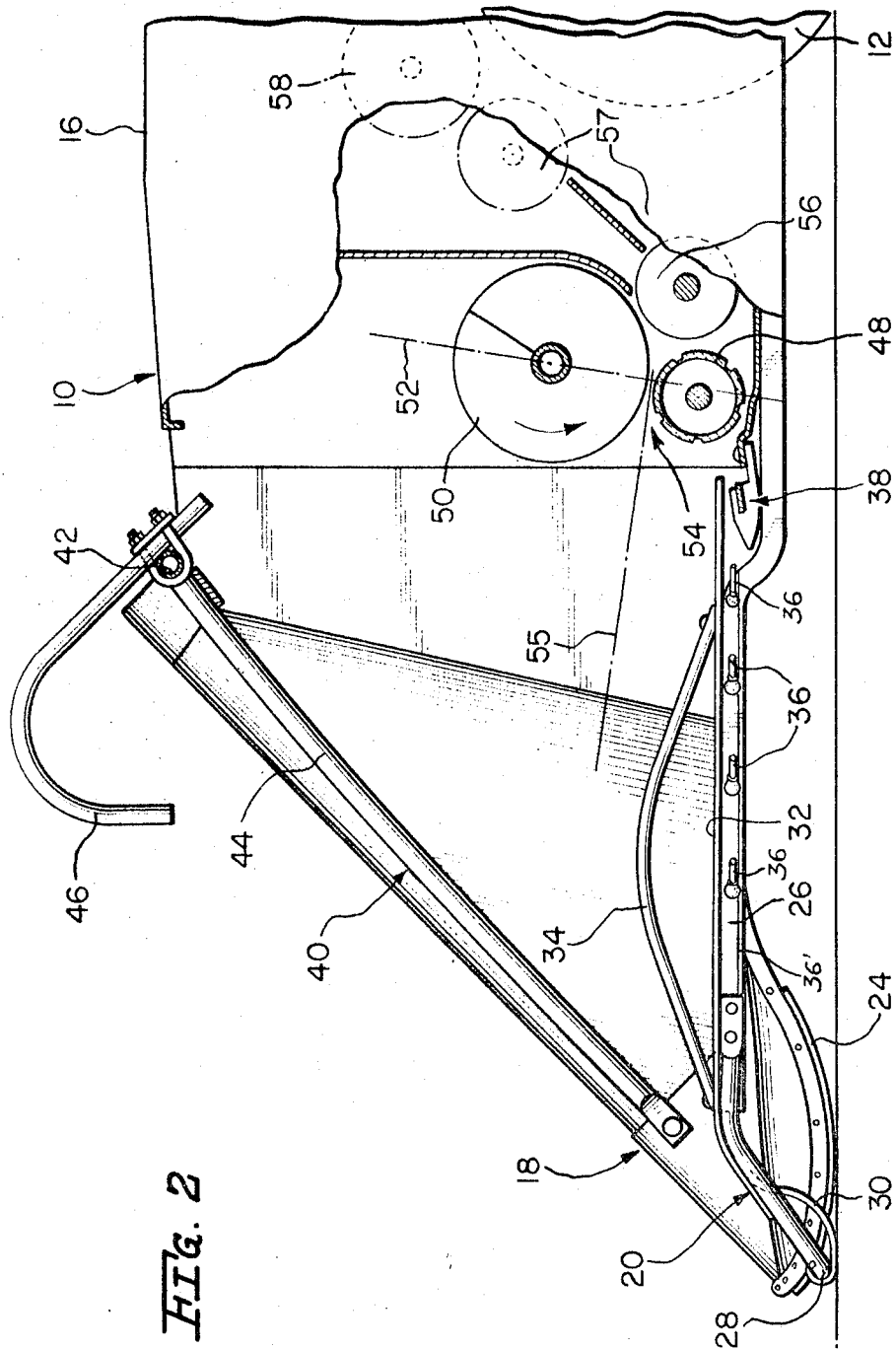

ABSTRACT OF THE DISCLOSURE

A harvester having a platform with a cutter at its leading edge, dividers extending forwardly of the cutter and forming plant passages therebetween into which project fingers forming a bed, above the cutter, the fingers flex horizontally to pass the stalks of plants to the cutter, a support for the fingers to limit their downward movement, and a pair of rollers having an upwardly directed purchase for grasping the butt ends of the cut stalks and lifting the plant over the cutter while feeding it to associated processing mechanism.

---

The present invention relates to a row crop harvester.

In the cutting of row crops, a peculiar difficulty is encountered in that the plants or stalks after being cut fall or are forced forwardly, tending to fall in the same row from which they are cut. They remain positioned with their top ends inclined upwardly and forwardly and heretofore difficulty has been encountered in conveying the plants from such inclined position rearwardly through the harvester. Also the plants tended to be carried rearwardly and be recut, and otherwise render it difficult or inefficient to perform a continuing cutting operation.

A broad object of the present invention is to provide a row crop harvester of novel construction wherein the disadvantages referred to above are obviated and other advantages provided.

A more specific object is to provide a row crop harvester which incorporates novel means for gripping the plants after being cut and moving them rearwardly in such a manner as to hold the upper loose ends of the plants inclined upwardly while so moving them, thereby tending to hold the upper ends of the plant free of the mass of plants still ahead being cut later.

Another object is to provide a row crop harvester of the character just referred to in which the means for retaining the upper ends of the plants upwardly includes a pair of rollers which grip the plants therebetween and are arranged so that the bite of the rollers is directed at the inclination stated, whereby to hold or retain the cut plants at that inclination.

A further object is to provide a row crop harvester which includes means for continuously moving the plants out of the row from which they have been cut, thereby preventing their being recut.

A still more specific object is to provide a row crop harvester of the character just referred to having a platform arranged for receiving the plants after being moved out of the rows from which they have been cut, and means for continuously moving the cut plants onto the platform.

An additional object of the invention is to provide a row crop harvester of the foregoing general character wherein the plants after being cut are forced at least partially through the harvester by the plants ahead of them that are uncut.

A further object is to provide a row crop harvester of the character referred to having novel construction specially accommodating rows of non-uniform spacing.

Other objects and advantages of the invention will appear from the following detail description taken in conjunction with the accompanying drawings wherein:

FIGURE 1 is a perspective view of a row crop harvester embodying the features of the present invention; and FIGURE 2 is a sectional view taken substantially at line 2—2 of FIGURE 1.

The harvester made according to the present invention includes a chassis indicated in its entirety at 10 having wheels 12 for moving along the rows of plants to be cut, the harvester in this case being a two-row implement. The chassis includes a tongue 14 for connection with a tractor and the harvester includes a secondary harvesting unit or component 16, the detailed nature of which does not enter into the present invention. The component 16 may for example be a cutter or chopper which receives the plants after being cut in the primary operation.

The harvester includes a pair of side gathering dividers 18 and a center gathering point 20 which serves as a platform or table, defining a pair of gathering passageways 22. The dividers and gathering point may be mounted on the chassis in any suitable manner, the side gathering dividers 18 including inwardly directed shelves for lifting downed material.

The center gathering point or platform 20 is of special construction and located at a special position in accordance with the features of the invention. This center gathering point includes a frame 26 having a leading end or nose 28 which may be inclined downwardly at its forward end and having a ground engaging skid 30. Secured to the frame 26 is a sheet forming a deck 32 from the rear or inner end to adjacent its outer end, and along its side marginal edges are rails or wall elements 34 which may be in the form of rods or bails serving to confine the cut plants on the deck. The center gathering point or platform is substantially of the same length as the side gathering dividers, to aid in supporting the cut plants as will be referred to below.

The gathering passageways 22 are relatively wide, and thereby accommodate wide variations in the spacing between the rows of plants being cut. Fingers 36 are mounted on the side marginal edges of the frame elements defining the gathering passageways, generally toward the rear of those passageways. These fingers are flexible in rearward direction, but not in downward direction, allowing the plants to pass therethrough in rearward direction, but resisting downward movement of the fingers so that they support the plants after they are cut.

Immediately to the rear of the gathering passageways 22 is a cutting means 38 preferably in the form of a reciprocating sickle. This may be a continuous sickle extending across the implement, or provided with spaced portions only at the passageways. In either case, they extend entirely across the passageways and cut all of the plants moving therethrough.

A guide means 40 is provided in the form of a looped bail, having its front ends secured to the side gathering dividers 18 at points adjacent the front thereof and extending rearwardly and upwardly where its closed end is mounted on the frame of the machine at 42. This bail has segments 44 leading rearwardly from the front ends that are inclined in a suitable direction for deflecting the plants as will be referred to again hereinbelow. A center guide 46 is secured to the closed end 42 of the bail, extending forwardly for limiting the plants at that location from being moved past the center.

Rearwardly of the cutting means 38 is an assemblage of operating elements which convey the plants after being cut to the secondary unit 16 and otherwise control and confine the plants for conveying them in a predetermined manner. These elements include a pick-up roller 48 at a lower position and immediately behind the sickle. This roller preferably is provided with helical slats and rotates in such direction (clockwise, FIG. 2) for conveying or urging the plants inwardly toward the center.

Upwardly of the pick-up roller 48 is another roller 50 preferably in the form of a double auger, this auger also rotating in such direction (counterclockwise, FIG. 2) as to feed or urge the cut plants inwardly toward the center. Preferably the flights of the two halves of the auger are spaced apart slightly. The position of the roller or auger 50 relative to the pick-up roller 48 is of importance and as shown in FIGURE 2 is disposed more to the rear than the pick-up roller 48, i.e., its axis is rearwardly of the axis of the pick-up roller, this relationship being indicated by the dot-dash line 52, the rollers thus providing a bite 54 which is directed forwardly in an upwardly inclined direction, as indicated by the line 55. In addition the auger core is of a small diameter shaft so as to expose the periphery of the roller therebeneath such that as the butt end of the plant enters the flights of the auger it will immediately ride on the lower roller and enter between the seats so that a positive grasp is obtained.

The rollers 48 and 50 preferably extend the full width of the implement, and at least from the outer limits of the passageways 22 and serve to move or urge the cut plants inwardly to the center, onto, either directly or indirectly, the deck 32 on the center gathering point. These two rollers 48, 50 also, of course, feed the cut plants rearwardly therebetween, which are then taken up by additional rollers 56, 57, 58 which may be of any desired type and serve to feed the plants into the unit or cutter 16. The rollers 56, 57, 58 may be of conventional construction, but the lowermost one of them is sufficiently low to effectively receive the butt ends of the plants from the bite of the rolls 48, 50, which are inclined downwardly, as referred to again hereinbelow. Preferably the rollers 56, 57, 58 are of limited length, being disposed centrally and receiving the cut plants after being moved inwardly to the center by the rollers 48, 50.

In the cutting operation, as the implement or harvester moves along the rows of plants, the plants are engaged by the guide 40 before they reach the sickle 38 and their upper ends are urged or biased inwardly toward a position over the platform or center gathering point 20, and then when they reach the sickle and are cut, a substantial portion of each plant has been removed inwardly from over the passageways so that as the oncoming plants that have not yet been cut engage those cut plants, they exert an additional force on the plants and continue to move them inwardly (as well as rearwardly). This in effect moves the cut plants out of the rows so that they do not fall directly onto the uncut plants ahead of them in the same row.

Immediately after the plants are cut, the butt ends thereof move into the bite 54 between the rollers 48, 50 and are gripped by those rollers and because of the inclination of the bite as referred to above, the rollers in so gripping the plants tend to lift the plants and reduce its drag over the support. Furthermore because of the upwardly open bite the butt end of the plant is entered into it prior to the plant following prostrate. Thus the auger and roller obtain a positive purchase on the plant and insure that it will be pulled into the rollers. This tends to free them from conflicting with the uncut plants. The rollers 48, 50 move the butt ends of the plants inwardly from the sides of the center, as noted above, away from the gathering passageways and into position in alignment with the rollers 56, 57, 58. Thus the rollers 48, 50 and the guide 40 together move the entire plants out of the passageways and onto the platform or center gathering point 20.

The cut plants are moved rearwardly by the rollers 48, 50 to a degree and to an extent they also are imparted a component of rearward force by the uncut plants. The plants produce quite a mass, filling up to a substantial degree the space between the side gathering dividers and under the guide 40. This is a continuously moving mass and the plants that had been cut and are disposed toward the rear, are constantly moved rearwardly by the uncut plants moving into this space with the consequence that the cut plants are forced positively rearwardly and into the rollers 56, 58. The center gathering point or platform 20 being a substantial length accommodates a great mass of plants that been moved inwardly from the gathering passageways, and at a central position in alignment with the intended concentration of plants forced rearwardly into the rollers 56, 57, 58. The side rails 34 perform a guiding action on the lower portion of the plants on the deck 32. The central guide 46 prevents overthrow of the plants at the top of the mass in either passageway, into the other passageway.

The harvester or implement made according to the invention eliminates the necessity of gathering chains and thereof is of extremely simple construction and can be made more compact. Additionally, because of the simple and compact construction, extremely narrowly spaced rows may be accommodated. Additionally, because of the wide passageways 22, irregularly spaced rows can be accommodated since the rows need not be centrally positioned in the passageways.

Another advantage of the harvester is that down plants are easily picked up and no provision need be made specially for the purpose of lifting them. Additionally, the fingers 36 prevent recutting of plants that have already been cut. This has been a disadvantage in previous harvesters of the row type, since often the plants after being cut, would tend to drop down into position whereby they would be recut, resulting in the disadvantage of less efficiency. Another disadvantage was that the recut portions drop under the sickle and are not recovered, resulting in series loss of the crop material.

While the foregoing disclosure is of a two row harvester, the invention is not limited thereto, being applicable to multiple row harvesters.

Referring to FIGURE 2 it will be noted that the fingers 36 collectively form a bed for supporting the cut plants. These fingers which comprise steel tines preferably embedded in rubber, although other flexible means can be used, are arranged to flex in a horizontal plane and are angled rearwardly from their anchorage in order to facilitate entry of the planets to the cutter. The cutter is located at an elevation below the plane of the bed formed by he fingers such that the rearwardmost finger provides a fulcrum for the stalk of the plant whereby as the plant falls is will rock about an axis above the plane of the mower and thus will swing upwardly into the lower roller which grasps the plant butt end before it falls in view of the exposure provided by the placement of the auger with its small diameter shaft rearwardly of the axis of rotation of the lower roller. It will be noted that the fingers are restricted from vertical deflection by providing a ledge flange 36′ below the fingers for engagement thereby when the fingers are loaded downwardly.

Another feature of the invention resides in providing a wide intake and passage so as to admit off-row or various row-spaced plants.

We claim:

1. A row crop harvester comprising a wheeled chassis adapted for moving along a row of plants, dividers forming a passageway, cutter means at the rear of the passageway, means on the harvester tending to force the upper ends of the cut plants forwardly, means adjacent the rear of the harvester for performing a secondary harvesting operation, and means for gripping the butt ends of the cut plants and feeding them rearwardly to the secondary harvesting means comprising a pair of rollers, said gripping and feeding means disposed adjacent to the cutter means and providing a forward upwardly directed purchase spaced upwardly from said cutter means for grasping the butt ends of the plants before they fall after being cut to hold the cut plants out of said cutter means.

2. The invention according to claim 1 wherein one of the pair of rollers operable upon rotation for gripping the plants and feeding them rearwardly comprises an auger.

3. The invention according to claim 1 wherein said rollers include an upper and a lower roller, and the axis of the upper roller is disposed rearwardly of the axis of the lower roller.

4. The invention according to claim 1 wherein the harvester includes three dividers forming two passageways, a center divider forming a platform, and said secondary harvesting means is of substantially lesser width than the transverse area connecting the two passageways and in substantial longitudinal alignment with the platform.

5. The invention according to claim 4 and deflecting means including a bail having arms with extended ends secured to the outer dividers and a central closed end over the platform and having segments over the passageways engaging the cut plants for deflecting them onto the platform.

6. The invention according to claim 5 wherein a center guide is provided, extending downwardly from the closed end of the bail and operative for preventing cut plants being deflected from the one passageway over the platform and into the other passageway, and the platform having side rails thereon for confining cut plants resting directly on the platform from being deflected laterally into the passageways.

7. In a harvester, a plant gathering structure including for a fore and aft passage, finger means extending into the passage and forming a bed thereacross, means flexibly mounting said finger means from said structure, and means additional to said mounting means restricting flexing of said finger means downwardly to prevent the plants from dropping off the bed.

8. The invention according to claim 7 and cutter means on said structure disposed across said passage at a level below the level of said bed, and at least one of the fingers forming a fulcrum for the plants as they are cut whereby the butt ends of the plants swing the cutter into an associated transfer means clear of the cutter to prevent recutting of the plants.

9. The invention according to claim 8 wherein said transfer means includes a pair of rollers having an upwardly and forwardly open bite for catching the butt ends of the plants as they fulcrum to prostrate position.

10. In a harvester crop gathering means comprising means for severing field borne crops from the ground, and means for removing the crops from said severing means including a pair of upper and lower cooperative rollers, said upper rollers displaced rearwardly of the lower roller and forming an upwardly forwardly directed crop engaging bite and said bite being located in a plane displaced upwardly from the severing means, whereby to obtain a purchase on the crops and lift them over the severing means.

References Cited

UNITED STATES PATENTS

| | | | |
|---|---|---|---|
| 2,860,476 | 11/1958 | Francis et al. | 56—119 |
| 2,867,961 | 1/1959 | Heilburn | 56—119 |
| 2,981,045 | 4/1961 | Blanshine et al. | 56—119 |
| 3,126,691 | 3/1964 | Krahn et al. | 56—119 |
| 3,139,717 | 7/1964 | Fischer | 56—23 |
| 3,139,718 | 7/1964 | Rickerd | 56—119 |
| 3,156,079 | 11/1964 | Park et al. | 56—119 |
| 3,357,467 | 12/1967 | Morkoski | 56—1 |

LOUIS G. MANCENE, Primary Examiner

P. A. RAZZANO, Assistant Examiner

U.S. Cl. X.R.

56—119